(12) United States Patent
Marin et al.

(10) Patent No.: US 11,982,879 B2
(45) Date of Patent: May 14, 2024

(54) METHOD FOR DETERMINING TO WHICH EXTENT A LENS DESIGN IS ADAPTED TO A USER

(71) Applicant: Essilor International, Charenton-le-Pont (FR)

(72) Inventors: Gildas Marin, Charenton-le-Pont (FR); Richard Legras, Orsay (FR); David Rio, Boston, MA (US)

(73) Assignee: Essilor International, Charenton-le-pont (FR)

( * ) Notice: Subject to any disclaimer, the term of this patent is extended or adjusted under 35 U.S.C. 154(b) by 699 days.

(21) Appl. No.: 17/048,703

(22) PCT Filed: Apr. 23, 2019

(86) PCT No.: PCT/EP2019/060363
§ 371 (c)(1),
(2) Date: Oct. 19, 2020

(87) PCT Pub. No.: WO2019/206905
PCT Pub. Date: Oct. 31, 2019

(65) Prior Publication Data
US 2021/0240008 A1    Aug. 5, 2021

(30) Foreign Application Priority Data
Apr. 23, 2018   (EP) ..................... 18305505

(51) Int. Cl.
*G02C 7/02*   (2006.01)
(52) U.S. Cl.
CPC ................. *G02C 7/027* (2013.01)

(58) Field of Classification Search
CPC ........ G02C 7/027; G02C 7/028; G02C 7/024; G02C 7/025; G02C 7/02; G02C 7/021; G02C 7/066; G02C 7/065; G02C 7/063
(Continued)

(56) References Cited

U.S. PATENT DOCUMENTS 8,573,778 B2   11/2013   Drobe et al.
8,708,485 B2    4/2014   Marin et al.
(Continued)

FOREIGN PATENT DOCUMENTS

CA        2469496   * 12/2002   ............... G02C 7/02
CN    101530318 A     9/2009
(Continued)

OTHER PUBLICATIONS

Machine Translation CA2469496 (Year: 2023).*
(Continued)

*Primary Examiner* — Travis S Fissel
(74) *Attorney, Agent, or Firm* — NIXON & VANDERHYE

(57) ABSTRACT

A method implemented by a computer means includes: obtaining a lens design; the lens design representing the variation of optical aberrations as a function of the angular view point; obtaining a set of subjective values representing the sensitivity of the user to a set of optical aberrations; and correlating the set of subjective values and the lens design based on the variation of optical aberrations so as to produce correlation information, advantageously for determining to which extent the lens design is adapted to the user from the correlation.

13 Claims, 3 Drawing Sheets

(58) Field of Classification Search
USPC ..... 351/159.73–159.74, 159.76–159.77, 178
See application file for complete search history.

(56) References Cited

U.S. PATENT DOCUMENTS

| | | |
|---|---|---|
| 8,721,082 B2 | 5/2014 | Drobe et al. |
| 2003/0164923 A1 | 9/2003 | Hirohara et al. |
| 2012/0092614 A1* | 4/2012 | Drobe .................. G02C 7/024 |
| | | 351/159.77 |
| 2013/0222764 A1* | 8/2013 | Thompson ............... A61B 3/18 |
| | | 351/209 |
| 2020/0041378 A1* | 2/2020 | Drew ................ G01M 11/0235 |

FOREIGN PATENT DOCUMENTS

| | | |
|---|---|---|
| CN | 102460273 A | 5/2012 |
| CN | 107077006 A | 8/2017 |
| DE | 10 2007 015 908 | 10/2008 |
| EP | 2 369 403 | 9/2011 |
| EP | 2448465 B1 | 9/2014 |
| EP | 3 006 991 | 4/2016 |
| FR | 2944364 A1 | 10/2010 |
| WO | 2010/142899 | 12/2010 |
| WO | 2011/058177 A1 | 5/2011 |
| WO | 2014/037482 | 3/2014 |

OTHER PUBLICATIONS

Office Action issued in Chinese Patent Application No. 201980028100.6 dated Jul. 26, 2022.
International Search Report and Written Opinion of the ISA for PCT/EP2019/060363 dated Aug. 8, 2019, 16 pages.

* cited by examiner

METHOD FOR DETERMINING TO WHICH EXTENT A LENS DESIGN IS ADAPTED TO A USER

This application is the U.S. national phase of International Application No. PCT/EP2019/060363 filed Apr. 23, 2019 which designated the U.S. and claims priority to EP Patent Application No. 18305505.2 filed Apr. 23, 2018, the entire contents of each of which are hereby incorporated by reference.

FIELD OF THE INVENTION

The present invention relates to a method for determining the level of acceptance of a lens design by a user, to methods for determining optical lens design based on the level of acceptance of a lens design by a user, and to a computer program carrying on the steps of the methods of the invention.

Additionally, the invention relates to a level of acceptance of a lens design by a user determining device, to a most appropriate lens design for a wearer determining device, and to an appropriate lens design for a wearer determining device.

BACKGROUND OF THE INVENTION

Recent improvements in the field of ophthalmic lenses, have allowed providing customized optical lenses, such customization going beyond the wearer's prescription. Further parameters than the wearer's prescription may be considered when designing an ophthalmic lens, leading to an increase of the number of lens designs.

One of the parameters whose importance is more and more considered while determining the optical design of lenses to be provided to a wearer is the comfort of said wearer while using the optical lenses. Different known parameters significantly impact the wearer's perceived wearing quality or comfort of the optical lenses or the wearer's appreciation of the lens design. One of these parameters is the sensitivity to optical aberrations. Indeed, it is known that the wearer's comfort is highly influenced by the wearer's sensitivity to the perceived optical aberrations and errors associated with the lens design.

Moreover, the eye-head behavior or activity of the wearer may impacts the perception of such optical aberrations. Yet the head-eye coefficient which qualifies the individual wearer's propensity to rather move the head or rather move the eyes is not related to an intrinsic sensitivity of the wearer to optical aberrations. Indeed, two wearers with the same eye-head coefficient (COT1=COT2) may have different sensitivities to optical aberrations and thus a different appreciation of the same lens design.

Therefore, the intrinsic sensitivity of the wearer to the different optical aberrations associated with optical lenses plays an important role in the wearer's appreciation of the lens design.

Usually the intrinsic sensitivity of the wearer to optical aberrations is determined by an ophthalmologist or optometrist in specific conditions that might influence the wearer. Indeed, the current methods implies a choice from the person that may disturb the result of the test and induce large change and variation depending on the context and situation. Thus current methods are not well adapted to evaluate subjective perception of optical aberrations.

Therefore there is a need for a method adapted to determine the subjective intrinsic sensitivity of a user to optical aberrations, and thus to evaluate the wearer's appreciation of a lens design that would give relevant and not fluctuating results in a fast and easy way.

One object of the present invention is to provide a method for easily evaluating the wearer's appreciation of a lens design corresponding to the level of acceptance of a lens design by a user.

SUMMARY OF THE INVENTION

To this end, the disclosure proposes a method, for example implemented by computer means for determining to which extent a lens design is adapted to a wearer, the method comprising:
- obtaining a lens design; the lens design representing the variation of optical aberrations as a function of the angular view point;
- obtaining a set of subjective values representing the sensitivity of the user to a set of optical aberrations;
- correlating the set of subjective values and the lens design based on the set of optical aberrations so as to produce correlation information, advantageously for determining to which extent said lens design is adapted to said user from said correlation.

Advantageously, the method according to the disclosure allows determining the level of acceptance of a specific lens design by a user, a subjective value quantifying the wearer's appreciation of the lens design, in a relevant and not fluctuating way that is fast and easy to perform.

In other words, the inventors have observed that by associating the correlation of the user's perceived quality with a variation of optical aberrations, which is specific to said user, with another correlation of zones of a lens design with a set of optical aberrations, which is specific to said lens design, the determination of the user's perceived quality for each zones of the lens design, which corresponds to the level of acceptance of said specific lens design by said user is facilitated and rendered more relevant and less fluctuating.

According to further embodiments which can be considered alone or in combination:
- the method comprises prior to correlating the set of subjective values and the lens design, defining zones on the lens design, and wherein the correlation of the set of subjective values and the lens design is performed for each defined zone of said lens design;
- the lens design is a progressive addition lens design; and/or
- the set of subjective values are obtained by receiving from the user, grades of the quality of presented simulated images representing real optical errors; and/or
- the presented images representing real optical errors are graded by the user using a gradation scale; and/or
- the presented simulated images are simulated as if they were seen at a targeted distance; and/or
- the type of the simulated presented images is adapted for a targeted distance; and/or
- the simulated images are presented in viewing conditions chosen from a list comprising standard vision, night vision, and low light vision; and/or
- the gradation scale is a 5-items gradation scale from 0 to 100 with steps of 20; and/or
- the images are seen through real optics; and/or
- the images are seen through a sphero-cylindrical correction giving at least a 6/6 high contrast acuity; and/or
- a 3 mm pupil is worn in front of the eye while grading the presented simulated images; and/or the method further comprises prior to obtaining the set of subjective values of the user, obtaining information on a best eye of the user, the best eye of the user being the eye with the best visual acuity, and wherein the set of subjective values is obtained grading the presented simulated pictures using only the eye with the best visual acuity; and/or the method further comprises prior to obtaining the set of subjective values of the user, obtaining information on a best eye of the user, the best eye of the user being the eye with the lowest aberration level, and wherein the set of subjective values is obtained grading the presented simulated pictures using only the eye with the lowest aberration level; and/or the method further comprises prior to obtaining the set of subjective values of the user, obtaining information on a dominant eye of the user, and wherein the set of subjective values is obtained grading the presented simulated pictures using only the dominant eye; and/or the method further comprises determining a level of acceptance of the lens design by a user based on the correlation information; and/or the method further comprises controlling a display of a design map of the user, the design map corresponding to a representation of the correlation information.

Another object of the disclosure relates to a method, for example implemented by computer means for determining the most appropriate lens design for a wearer, the method comprising:

obtaining a set of subjective values representing the sensitivity of the user to a set of optical aberrations;

determining a level of acceptance of multiple lens designs by the user f according to the method of the disclosure;

comparing the levels of acceptance of the multiple lens designs; and determining the most appropriate lens design for the wearer based on the comparison of the levels of acceptance of the multiple lens designs.

According to further embodiments which can be considered alone or in combination:

the method comprises prior to comparing the levels of acceptance of the multiple lens design, defining zones on the lens design corresponding to different values of level of acceptance of the lens design and obtaining a level of satisfaction, and wherein during the step of comparing the multiple lens designs, the design maps are compared to determine the most appropriate lens design for the wearer; and/or the most appropriate lens design for the wearer is the one with the smallest zone representing a level of acceptance lower than the level of satisfaction; and/or the most appropriate lens design for the wearer is the one with the biggest zone representing a level of acceptance higher than the level of satisfaction.

According to a further aspect, the disclosure further relates to a method, for example implemented by computer means for determining at least an appropriate lens design for a wearer, the method comprising:

selecting a lens design;

determining a level of acceptance of the selected lens design by a user according to the method of the disclosure; and obtaining a level of satisfaction, and comparing the level of acceptance of the selected lens design by the user with the level of satisfaction, wherein if the level of acceptance of the selected lens design by the user is greater or equal to the level of satisfaction the lens design is deemed to be acceptable for said user.

According to further embodiments which can be considered alone or in combination:

the method further comprises prior to determining the level of acceptance of the selected lens design by the user, defining zones on the selected lens design, wherein the level of acceptance of the lens design by the user is determined for each defined zone of said lens design, and prior to comparing the level of acceptance of the lens design for each zone of the lens design and the level of satisfaction, weighting by the percentage of use repartition of said wearer the level of acceptance of the lens design for each zone of the selected lens design is, and wherein the weighted level of acceptance is compared to the level of satisfaction, wherein if the weighted level of acceptance of the selected lens design by a user is greater or equal to the level of satisfaction the lens design is deemed to be acceptable for said user; and/or the level of satisfaction corresponds to a minimal acceptable level of acceptance of the lens design.

According to a further aspect, the disclosure further relates to a device comprising a processor adapted to store one or more sequence of instructions and to carry out at least one of the steps of the method according to the disclosure.

The disclosure further relates to a computer readable medium carrying one or more sequences of instructions of the computer program product according to the disclosure.

More particularly, the disclosure relates to a level of acceptance of a lens design by a user determining device configured for determining the level of acceptance of a lens design by a user, the device comprising:

a communication unit configured to obtain a set of subjective values representing the sensibility of the user to a set of optical aberrations, and a lens design, a memory storing computer executable instructions and configured to store the received set of subjective values and design map;

at least one processor for executing the computer executable instructions, wherein the computer executable instructions comprise instructions for determining the level of acceptance of a lens design by a user based on data correlation of the set of subjective values and the lens design.

According to a further aspect, the disclosure further relates to a most appropriate lens design for a wearer determining device configured for determining the most appropriate lens design for a wearer, the device comprising:

a communication unit configured to obtain levels of acceptance data relating to the levels of acceptance of the user of multiple lens designs;

a memory storing computer executable instructions and configured to store the levels of acceptance data;

at least one processor for executing the computer executable instructions, wherein the computer executable instructions comprise instructions for determining the most appropriate lens design for a wearer based on the levels of acceptance data.

Another object of the disclosure relates to an appropriate lens design for a wearer determining device configured for determining at least an appropriate lens design for a wearer, the device comprising:

a communication unit configured to obtain level of acceptance data relating to the level of acceptance of a lens design by a user; and level of satisfaction data relating to a level of satisfaction;

a memory storing computer executable instructions and configured to store the received level of acceptance data and level of satisfaction data;

at least one processor for executing the computer executable instructions, wherein the computer executable instructions comprise instructions for determining at least an appropriate lens design for a wearer based on the level of acceptance data and the level of satisfaction data.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method.

The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which.

DETAILED DESCRIPTION OF PREFERRED EMBODIMENTS

The disclosure relates to a method implemented by computer means for determining to which extent a lens design is adapted to a user.

Figure 1:
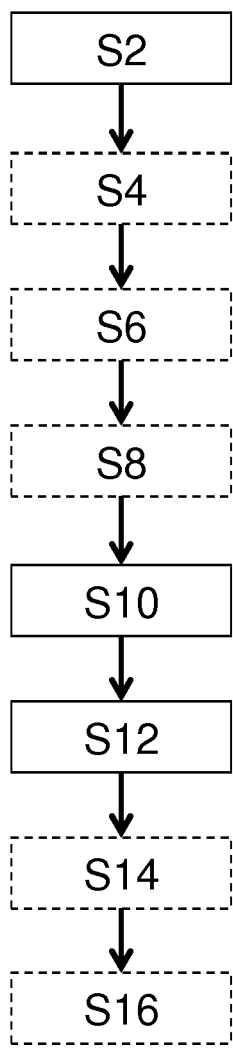
FIG. 1 is an illustration of a chart-flow embodiment of the method for determining to which extent a lens design is adapted to a user according to the invention.

As illustrated on FIG. 1, the method for determining to which extent a lens is adapted to a user comprises at least:
obtaining a lens design; the lens design representing the variation of optical aberrations as a function of the angular view point;
obtaining a set of subjective values representing the sensitivity of the user to a set of optical aberrations,
correlating the set of subjective values and the lens design based on the set of optical aberrations so as to produce correlation information, advantageously for determining to which extent said lens design is adapted to said user from said correlation.

Every user reacts differently to each lens design and expresses preferences for certain types of lens design. Such preference can be evaluated by the level of acceptance of a lens design by a user, the level of acceptance of a lens design by a user representing its perceived quality or comfort while looking through the lens design.

As represented on FIG. 1, the method for determining to which extent a lens design is adapted to a user comprises a step S2 of obtaining a lens design. In the sense of the disclosure, the term "obtaining" encompasses receiving and determining.

In the sense of the disclosure the term "lens design" is a generic term which designates the set of parameters allowing defining a dioptric function of an ophthalmic lens. Furthermore, the lens design comprises different types of lens design such as monofocal lens designs, bifocal lens designs, and progressive addition lens designs among others.

Figure 4:
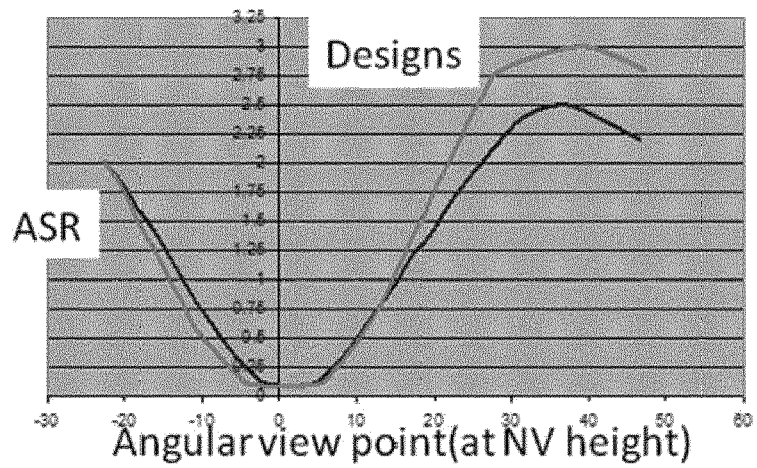
FIG. 4 is an illustration of a lens design represented by the variation of optical aberrations as a function of the angular view point in the horizontal field of view.

As represented on FIG. 4, a specific lens design can be expressed as a graphic representing the variation of optical aberrations as a function of the angular view point in the horizontal field of view at a specific height, for example at the near vision height.

Sensitivity of the user to optical aberrations can be determined objectively, for example thanks to a perception test, or subjectively by means of an image quality gradation test. This sensitivity to optical aberration can be manifested among others as discomfort (pitch) and/or a change of the perception of visual index (for example: curvatures), and/or motor skills (for example: modification of eye-head coordination, postural oscillation) and/or sensorimotor loops (for example: change in response times). The subjectively evaluated profile of the user's sensitivity to optical aberrations obtained by means of a gradation test forms the notation table.

As represented on FIG. 1, the method for determining to which extent a lens design is adapted to a user comprises a step S10 of obtaining a set of subjective values representing the sensitivity of the user to a set of optical aberrations. In the sense of the disclosure, the term "obtaining" encompasses receiving and determining.

The set of subjective values may be expressed as a notation table corresponding to a table associating the user's subjective gradations of presented pictures with different levels of optical aberrations to said levels of optical aberrations.

Preferably, the method according to the disclosure further comprises a step S6 of receiving grades given by the user, said grades representing the quality of simulated images of real optical errors or aberrations.

The gradation test consists in presenting to the user a first perfect image with no optical aberration. Simulated images corresponding to different level of degradation of the first perfect image and representing different levels of optical aberration are then successively and randomly presented to the user. The user associates to the presented image a subjective grade representing its perceived quality of the presented image. The user grades each image multiple times, the perfect image and simulated images being presented in random order.

Figure 2:
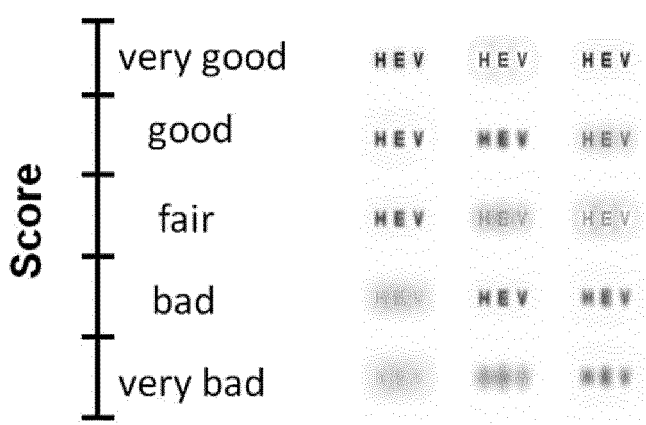
FIG. 2 illustrates an example of simulated images graded using a 5-items scale by a user.

With reference to FIG. 2, the subjective perceived quality of the presented image can be quantified using a gradation scale. The different presented images with associated different optical aberrations are graded by the user by using a gradation scale.

Figure 3:
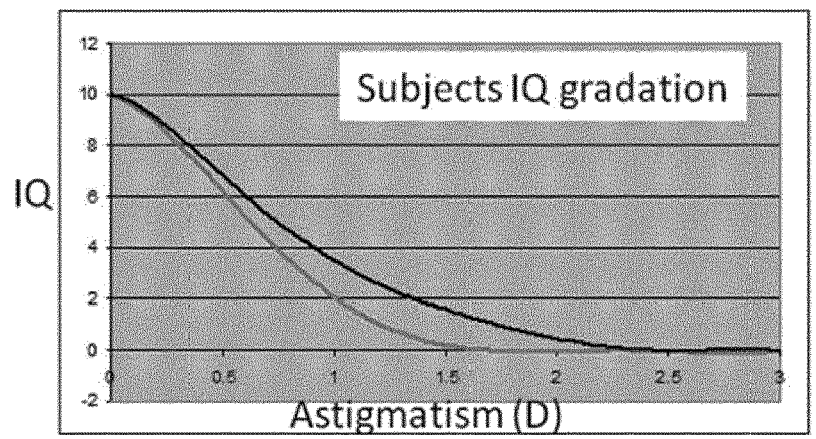
FIG. 3 illustrates an example of a set of subjective values representing the sensitivity of the user to a set of optical aberrations.

As represented on FIG. 3, the set of subjective values of a user can be expressed as a graphic representing the user's perceived quality of the presented image as a function of the different levels of optical aberrations.

Simulated images with induced optical aberration are obtained using a numerical simulation consisting in a convolution of a sharp image and a point-spread function including the spherical defocus, the astigmatism, other higher order geometrical aberrations, the chromatic aberration, pupil diameter, diffraction and diffusion. Moreover, the numerical simulation take into account the viewing distance and the size of the display.

Moreover, the numerical simulation of images takes into account the viewing distance at the time of the gradation test. The images can be simulated to correspond to images seen at a specific targeted distance. For example the images are simulated as if they were seen a near vision distance, intermediate vision distance or at far vision distance.

Additionally, the type of presented simulated images can be adapted to the targeted viewing distance at the time of the gradation test. For example, the presented simulated images can represent words or letters for near vision distance or a natural scene for far vision distance.

Furthermore, the presented simulated images can also be adapted to represent different viewing conditions such as standard vision, low light vision and/or night vision.

The presented simulated images may be graded using a 5-items gradation scale, for example from 0 to 100 with steps of 20. For example, the 5 items correspond respectively to excellent, good, fair, poor and bad image quality.

According to an embodiment of the disclosure, the presented simulated images the user have to grade are seen through real optics.

Preferably, the presented images are seen through a sphero-cylindrical correction giving at least a 6/6 high contrast visual acuity.

Preferably, the presented images are seen by the user through a 3 mm pupil. Advantageously, the use of a 3 mm pupil worn in front of the eye of the user allows limiting the impact of the user's own optical aberrations.

The gradation step is normally done in binocular condition with the two eyes open and used but can also be performed in monocular conditions.

As represented on FIG. 1, the method for determining to which extent a lens design is adapted to a user may comprise prior to step S6 of receiving grades from the user, a step S4 of obtaining information on the best eye of the user. Information on the best eye of the user may be received or determined using well known method of the prior art.

The "best eye" is a generic term used to designate the eye with the best acuity, the eye with the lowest aberration level or the dominant eye.

The grades on the quality of presented simulated images received during step S6 may be obtained by grading said images in monocular conditions using the best eye of the user.

Grading the presented simulated images in monocular conditions, for example using the best eye, allows obtaining a more accurate evaluation of the perceived quality of the presented images.

As represented on FIG. 1, the method for determining to which extent a lens design is adapted for a user comprises a step S12 of correlating the set of subjective values and the lens design based on the set of optical aberrations so as to obtain correlation information.

As represented on FIG. 3, the set of subjective values can be expressed as a graphic representing the user's perceived quality of the presented image as a function of the different levels of optical aberrations associated with each of these images. As represented on FIG. 4, a specific lens design can be expressed as a graphic representing the variation of optical aberrations as a function of the angular view point in the horizontal field of view at a specific height, for example at the near vision height.

The correlation of these two graphics which correspond to the correlation of a set of subjective values representing the user's perceived quality of pictures as a function of the level of optical aberrations and a specific lens design represented by variations of levels of optical aberrations as a function of the angular view point in the horizontal field of view at a specific height permits obtaining correlation information which represent the user's perceived quality of pictures expressed as a function of the angular view point in the horizontal field of view at a specific height.

The method according to the disclosure further comprises a step S14 of determining the level of acceptance of the specific lens design by the user.

During step S14, the level of acceptance of a lens design by a user is determined based on the correlation information.

Figure 5:
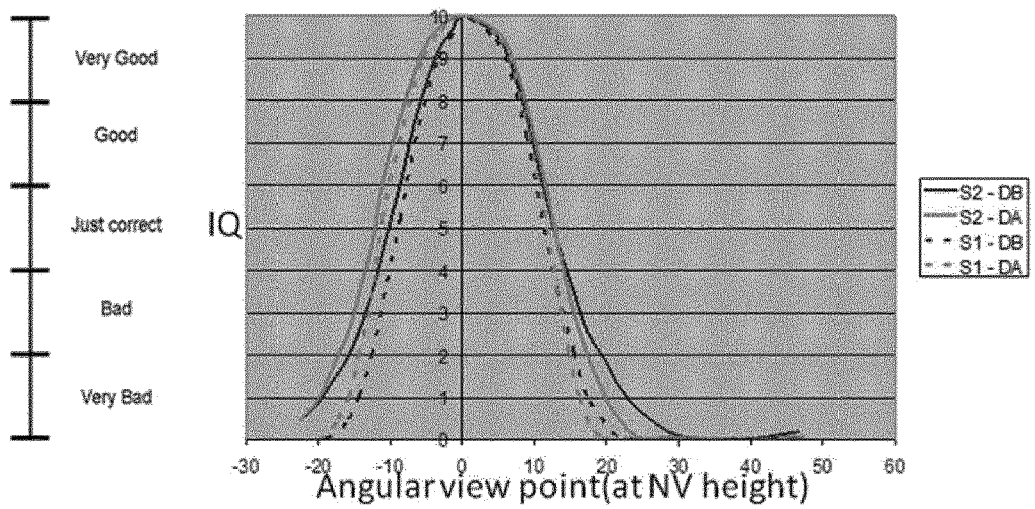
FIG. 5 is an illustration of an exemplary representation of the levels of acceptance of a user of different lens designs.

Such level of acceptance of a specific lens design by the user represented on FIG. 5 can be expressed as a function representing the user's perceived quality of pictures represented times the angular view point in the horizontal field of view at a specific height.

The level of acceptance of a lens design by the user represents a relevant and not fluctuating evaluation of the perceived quality and comfort of a user of a lens design.

With reference to FIG. 1, the method for determining to which extent a lens design is adapted to a user may further comprise a step S16 of controlling a display of the design map of the user. In the sense of the disclosure, the term "controlling a display of the design map" emphasizes "displaying the design map".

Figure 6:
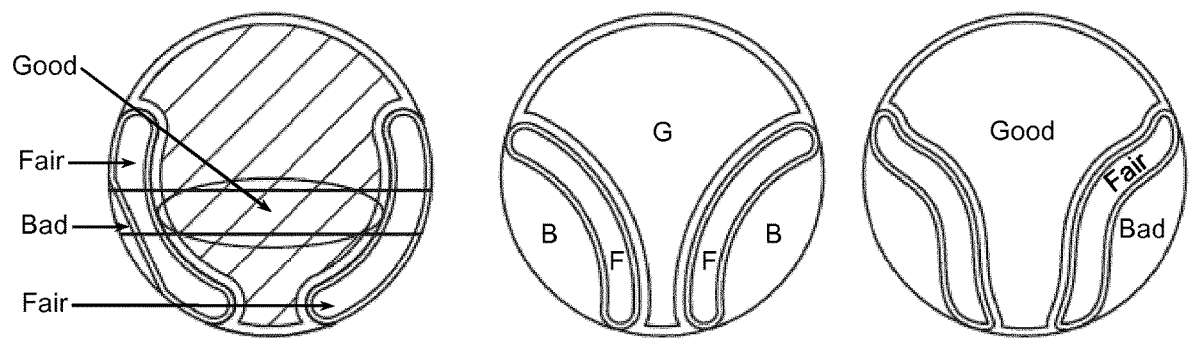
FIG. 6 is an illustration of exemplary design maps.

As represented on FIG. 6 the correlation information can also be represented as a design map. The design map which corresponds to the correlation of the set of subjective values representing the sensitivity of a user to optical aberration and a lens design represents another way to express the correlation information.

The level of acceptance of a lens design by a user and the corresponding design map of a user of a lens design represent an evaluation of the visual performance of a user when using the lens design.

As represented on FIG. 1, the method may further comprise prior to step S12 of correlating the set of subjective values and the lens design, a step S8 of defining zones on a lens design. For example zones may be defined around the optical center of the lens, around the near vision zone and/or around the far vision zone.

Steps S12 of correlating the set of subjective values and the lens design and S14 of determining the level of acceptance of the lens design by the user may be carried out for each defined zone of the lens design so as to determine a level of acceptance of each of said defined zones.

Advantageously, by defining specific zones of the lens design, it is possible to focus the determination of the level of acceptance for specific types of aberrations relating to said specific zones.

For example, zones such as far vision zone, may be defined on the provided lens design. Simulated images representing optical aberrations in the far vision zone are evaluated by the user so as to determine a set of subjective values of said user for said defined far vision zone of any lens design. The set of subjective values of the user is further correlated to the selected lens design, and more particularly to the defined zone of said lens design so as to determine the level of acceptance of said zone of the defined lens design by the user.

Figure 7:
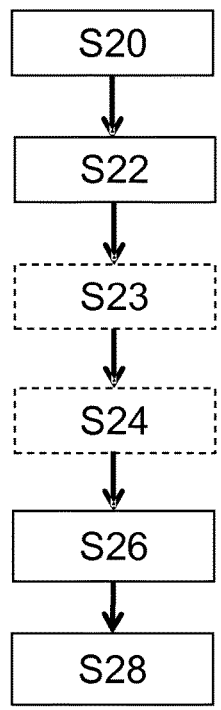
FIG. 7 is an illustration of a chart-flow embodiment of the method for determining the most appropriate lens design for a wearer according to the invention.

With reference to FIG. 7, the disclosure further relates to a method for determining the most appropriate lens design for a wearer.

During step S20, a set of subjective values representing the user's sensitivity to optical aberrations is obtained. In the sense of the disclosure, the term "obtaining" encompasses receiving and determining.

The method for determining the most appropriate lens design for a wearer further comprises a step S22 of determining the level of acceptance of multiple lens designs by said user.

During step S22, multiple different lens designs are selected and the level of acceptance of each selected lens design by a user is determined. The level of acceptance of each lens design by the user is determined according to the above described method of the disclosure for determining a level of acceptance of a lens design by a user based on the correlation of the set of subjective values of the user and a lens design according to the above described method.

During step S26, the levels of acceptance of the multiple lens designs are compared together in order to determine the most appropriate lens design for the wearer.

During step S28, the most appropriate lens design is determined. For example, the most appropriate lens design for a wearer may correspond to the lens design for which the level of acceptance is the highest.

The method for determining the most appropriate lens design for a wearer according to an embodiment of the disclosure may further comprise prior to step S26 of comparing the levels of acceptance of different lens designs, a step S23 of defining zones on the lens designs. During step S23, zones corresponding to specific values of level of acceptance are defined for each lens designs. Such zones of a lens design may be represented as a design map. For examples zones of the lens design with a level of acceptance comprises between 0 and 20 excluded correspond to the "very bad zone", between 20 and 40 excluded to the "bad zone", between 40 and 60 excluded to the "fair zone", between 60 and 80 excluded to the "good zone", and between 80 and 100 to the "very good zone".

The method for determining the most appropriate lens design for a wearer according to an embodiment of the disclosure may further comprise prior to step S26 of comparing the levels of acceptance of a lens design, a step S24 of obtaining a level of satisfaction.

The level of satisfaction corresponds to a threshold value for the level of acceptance of a lens design that represents the minimal acceptable level of acceptance of a lens design.

During step S26, the design maps of each of the multiple lens designs are compared between each other so as to determine the most appropriate lens for a wearer.

The most appropriate lens design for a wearer may correspond to the lens design with the smallest zone representing a level of acceptance lower than the level of satisfaction.

Alternatively the most appropriate lens design for a wearer may correspond to the lens design with the biggest zone representing a level of acceptance higher than the level of satisfaction.

Figure 8:
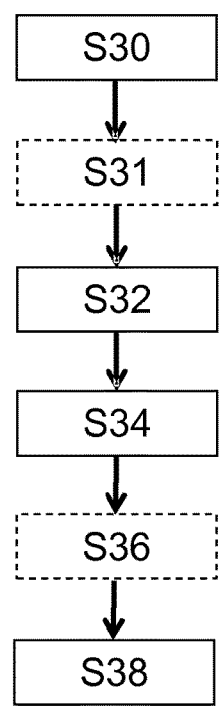
FIG. 8 is an illustration of a chart-flow embodiment of the method for determining at least an appropriate lens design for a wearer according to the invention.

With reference to FIG. 8, the disclosure further relates to a method for determining at least an appropriate lens design for a wearer.

During step 30, a first lens design is selected.

During step S32, the level of acceptance of the selected lens design by a user is determined according to the method of the disclosure based on the correlation of a set of subjective values representing the sensitivity of the user to optical aberrations and the selected lens design.

During step S34, a level of satisfaction corresponding the minimal acceptable level of acceptance of a lens design by a user is obtained.

The level of satisfaction corresponds to a threshold value for the level of acceptance of a lens design that represents the minimal acceptable level of acceptance of a lens design. In other words, the level of satisfaction represents the minimal tolerance of the user for a level lens design.

The level of acceptance of the selected lens design by the user o is then compared to the level of satisfaction during step S38. If the level of acceptance is higher or equal to the level of satisfaction, the lens design is considered to be appropriated for the user.

Otherwise, if the level of acceptance of the selected lens design by the user is smaller than the level of satisfaction, the lens design is considered to be not appropriated for the wearer and steps S30 to S38 are repeated with a different lens design until at least one appropriate design is determined.

Additionally, the method for determining at least an appropriate lens design for a wearer may comprise prior to determining the level of acceptance of the selected lens design by the user, a step S31 of defining zones on the selected lens design. For example zones may be defined around the optical center of the lens, around the near vision zone and/or around the far vision zone.

During step S32, the level of acceptance of each defined zone of the selected lens design by the user may be defined according to the method of the disclosure.

The method for determining at least an appropriate lens design for a wearer may further comprise prior to comparing the level of acceptance of each zone of the lens design by the user and the level of satisfaction, a step S36 of weighting by the percentage of use repartition of the user the level of acceptance of each zone of the selected lens design by the user.

The percentage of use repartition corresponds to the probability of use of the lens design at each point by the user.

The weighted level of acceptance of the lens design by a user may further be compared to the level of satisfaction during step S38.

If the weighted level of acceptance of the selected lens design by the user is greater or equal to the level of satisfaction the lens design is deemed to be acceptable for said user According to another aspect, the disclosure further relates to a computer product adapted to implement a method of the disclosure for determining a level of acceptance of a lens design by a user, or for determining a or the most appropriate lens design for a wearer.

The computer program product comprises software code adapted to perform any embodiment of the methods described in the present disclosure, whether taken alone or in combination.

In other words, the disclosure may further relates to a non-transitory program storage device, readable by a computer, tangibly embodying a program of instructions executable by the computer to perform any embodiment of the methods described in the present disclosure, whether taken alone or in combination.

According to another aspect, the disclosure further relates to a level of acceptance of a lens design by a user determining device configured for determining to which extent a lens design is adapted to a user.

The level of acceptance of a lens design by a user determining device comprises a communication unit configured to obtain data set of subjective values representing the sensitivity of the user to a set of optical aberrations and a lens design.

Furthermore, the level of acceptance of a lens design by a user determining device comprises a memory storing computer executable instructions and configured to store the received set of subjective data and lens design.

Moreover, the level of acceptance of a lens design of a user determining device comprises at least one processor for executing the computer executable instructions.

The computer executable instructions comprise instructions for determining the level of acceptance of a lens design by a user of a lens design based on correlation information obtained by correlating the set of subjective values and the lens design according to a method of the disclosure.

According to another aspect, the disclosure further relates to a most appropriate lens design for a wearer determining device configured for determining the most appropriate lens design for a wearer.

The most appropriate lens design for a wearer determining device comprises a communication unit configured to obtain levels of acceptance data.

The levels of acceptance date relates to the levels of acceptance of the user of multiple lens designs.

Furthermore, the most appropriate lens design for a wearer determining device comprises a memory storing computer executable instructions and configured to store the levels of acceptance data.

Moreover, the most appropriate lens design for a wearer determining device comprises a processor for executing the computer executable instructions.

The computer executable instructions comprise instructions for determining the most appropriate lens design for a wearer based on the levels of acceptance data and according to the method of the disclosure.

According to another aspect, the disclosure further relates to an appropriate lens design for a wearer determining device configured for determining an appropriate lens design for a wearer.

The appropriate lens design for a wearer determining device comprises a communication unit configured to obtain levels of acceptance data.

The levels of acceptance date relates to the levels of acceptance of the user of multiple lens designs.

Furthermore, the appropriate lens design for a wearer determining device comprises a memory storing computer executable instructions and configured to store the levels of acceptance data.

Moreover, the appropriate lens design for a wearer determining device comprises a processor for executing the computer executable instructions.

The computer executable instructions comprise instructions for determining an appropriate lens design for a wearer based on the levels of acceptance data and according to the method of the disclosure.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by a computer, the method comprising:
   obtaining a lens design, the lens design representing the variation of optical aberrations as a function of the angular view point;
   obtaining a set of subjective values representing the sensitivity of the user to a set of optical aberrations, the set of subjective values being obtained by receiving grades provided by a user, said grades representing a quality of simulated images of real optical errors;
   correlating the set of subjective values and the lens design based on the variation of optical aberrations to produce correlation information; and
   determining a level of acceptance of the lens design by the user based on the correlation information.

2. The method according claim 1, further comprising, prior to correlating the set of subjective values and the lens design, defining zones on the lens design, wherein the correlation of the set of subjective values and the lens design is performed for each defined zone of the lens design.

3. The method according to claim 1, further comprising controlling a display of a design map of the user, the design map representing the correlation information.

4. A method implemented by a computer configured to determine a most appropriate lens design for a wearer, the method comprising:
obtaining a set of subjective values representing the sensitivity of the user to a set of optical aberrations;
determining levels of acceptance of multiple lens designs by a user according to the method of claim 1;
comparing the levels of acceptance of the multiple lens designs; and
determining the most appropriate lens design for the wearer based on the comparison of the levels of acceptance of the multiple lens designs.

5. The method according to claim 4, further comprising, prior to comparing the levels of acceptance of the multiple lens design, defining zones on a design map of each lens design, each defined zone corresponding to a specific value of level of acceptance, and obtaining a level of satisfaction, and
wherein during the comparing the levels of acceptance of the multiple lens designs, the design maps are compared between each other to determine the most appropriate lens design for the wearer.

6. The method according to claim 5, wherein the most appropriate lens design for the wearer is the one with the smallest zone representing a level of acceptance lower than the level of satisfaction.

7. The method according to claim 5, wherein the most appropriate lens design for the wearer is the one with the biggest zone representing a level of acceptance higher than the level of satisfaction.

8. A method implemented by a computer configured to determine at least an appropriate lens design for a wearer, the method comprising the following operations:
selecting a lens design;
determining a level of acceptance of the selected lens design by a user according to the method of claim 1;
obtaining a level of satisfaction; and
comparing the level of acceptance of the selected lens design by the user to the level of satisfaction,
wherein the operations are repeated with different lens designs until at least an appropriate lens design for the wearer is selected.

9. The method according to claim 8, further comprising:
prior to the determining the level of acceptance of the lens design by a user, defining zones on the lens design, the level of acceptance of the lens design by the user being determined for each defined zone of the lens design; and
prior to the comparing the level of acceptance of the lens design and the level of satisfaction, weighting by a percentage of use repartition of the user the level of acceptance of each defined zone of the lens design by the user, the weighted level of acceptance being compared to the level of satisfaction.

10. The method according to claim 8, wherein the level of satisfaction corresponds to a minimal acceptable level of acceptance of the lens design.

11. A non-transitory computer readable medium on which is stored one or more sequences of instructions of software code configured to perform the operations of the method according to claim 1 when executed by a processor.

12. The method according to claim 2, further comprising controlling a display of a design map of the user, the design map representing the correlation information.

13. A device for determining a level of acceptance of a lens design by a user, the device comprising:
a communication unit configured to obtain a set of subjective values representing a sensitivity of the user to a set of optical aberrations and a lens design, the set of subjective values being obtained by receiving grades provided by a user, said grades representing a quality of simulated images of real optical errors;
a memory storing computer-executable instructions and configured to store the received set of subjective values and the lens design; and
at least one processor configured to execute the computer-executable instructions,
wherein the computer executable instructions comprise instructions to determine the level of acceptance of the lens design by the user based on a correlation of the set of subjective values and the lens design.

* * * * *